(12) United States Patent
White

(10) Patent No.: US 10,936,379 B2
(45) Date of Patent: Mar. 2, 2021

(54) AUTOMATICALLY REPLICATE API CALLS TO SEPARATE DATA CENTERS

(71) Applicant: Citrix Systems, Inc., Fort Lauderdale, FL (US)

(72) Inventor: Jeremy White, Fort Lauderdale, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

(21) Appl. No.: 16/416,119

(22) Filed: May 17, 2019

(65) Prior Publication Data
US 2020/0364096 A1    Nov. 19, 2020

(51) Int. Cl.
*G06F 9/54* (2006.01)
*G06F 9/455* (2018.01)

(52) U.S. Cl.
CPC .......... *G06F 9/541* (2013.01); *G06F 9/45558* (2013.01); *G06F 9/547* (2013.01); *G06F 2009/4557* (2013.01); *G06F 2009/45595* (2013.01)

(58) Field of Classification Search
CPC ..................................................... G06F 9/541
USPC .......................................................... 719/328
See application file for complete search history.

(56) References Cited

U.S. PATENT DOCUMENTS

| | | | |
|---|---|---|---|
| 7,840,674 B1 | 11/2010 | Sterling | |
| 8,117,156 B2* | 2/2012 | Krishnaprasad | .... G06F 11/2094 707/637 |
| 8,812,714 B2 | 8/2014 | Sinha et al. | |
| 9,781,053 B1* | 10/2017 | Allen | ....................... H04L 47/74 |
| 10,031,948 B1* | 7/2018 | Kulshreshtha | .......... G06F 9/466 |
| 2014/0122572 A1 | 5/2014 | Finkelstein et al. | |

OTHER PUBLICATIONS

International Search Report and Written Opinion on International Appl. No. PCT/US2020/031042, dated Aug. 26, 2020.

* cited by examiner

*Primary Examiner* — Andy Ho
(74) *Attorney, Agent, or Firm* — Foley & Lardner LLP

(57) ABSTRACT

Described herein are systems and methods for transparent resiliency to multiple data centers. The systems and methods depicted determine if an application programming interface (API) call is idempotent. If the API call is idempotent, the calls can be concurrently forwarded to multiple datacenters. If the API call is not idempotent, the calls can be sent to each of a multiple datacenters in turn until a response is received or timeout occurs. Automatically providing multi-region calls in synchrony provides a faster response time during data center or regional failures. Automatically providing multi-region calls in synchrony at the appliance server side, moves the logic out of the client and into a transparent and centrally managed service. This can allow business logic to focus on the core logic and not on logic to retry requests or manage the multi-regional aspect of a dependent service.

20 Claims, 11 Drawing Sheets

AUTOMATICALLY REPLICATE API CALLS TO SEPARATE DATA CENTERS

FIELD OF THE DISCLOSURE

The present application generally relates to data centers, including but not limited to systems and methods for creating transparent resiliency to multiple data centers.

BACKGROUND

Requests may be sent by a requestor destined to one or more services or applications running in multiple data centers. The requests may be sent to one of those data centers which may have issues processing the request and either timeout or provide an error response. This can cause delay in servicing such requests and decrease the experience by the end user or impact the performance or operation of the service or application.

SUMMARY

This Summary is provided to introduce a selection of concepts in a simplified form that are further described below in the Detailed Description. This Summary is not intended to identify key features or essential features, nor is it intended to limit the scope of the claims included herewith.

Depicted below are systems and methods for transparent resiliency to multiple data centers. The systems and methods depicted determine if an application programming interface (API) call is idempotent. If the API call is idempotent, the calls can be concurrently forwarded to multiple datacenters. If the API call is not idempotent, the calls can be sent to each of a multiple datacenters in turn until a response is received or timeout occurs. Automatically providing multi-region calls in synchrony provides a faster response time during data center or regional failures. Automatically providing multi-region calls in synchrony at the appliance server side, moves the logic out of the client and into a transparent and centrally managed service. This can allow business logic to focus on the core logic and not on logic to retry requests or manage the multi-regional aspect of a dependent service.

An aspect provides a method for replicating calls to different data centers. The method may include receiving an application programming interface (API) request to access a service by a device. The device may be networked between one or more requestors and a one or more data centers. The data centers may provide the service requested by the requestor. The method may further include determining a policy for the request. The policy may determine that the API request is idempotent. The policy may further determine one or more rules identifying one or more data centers to which to replicate the API request. The method may include the device communicating replicate API requests to each of the data centers identified by the policies. The method may further include receiving, a response from a data center by the device. If the device receives more than one response, the method may include selecting a response to communicate to the requestor. The method may further include communicating the response from the device to the requestor.

The requestor may be a client, a server, a second service or a micro service. The data centers may be located in different geographies. The API request may request to access a micro service of a plurality of micro services that are components of the service. The device may communicate the replicate API requests to each data centers based at least on an order identified by the one or more rules of the policy. The device may select a response received from a data centered based on which of the one or more responses was received first. The device may select a response based on which of the one or more responses is successful.

An aspect provides a method for replicating calls to different data centers. The method may include receiving an application programming interface (API) request to access a service by a device. The device may be networked between one or more requestors and a one or more data centers. The data centers may provide the service requested by the requestor. The method may further include determining a policy for the request. The policy may determine that the API request is not idempotent. The policy may further determine one or more rules identifying one or more data centers to which to replicate the API request. The device may communicate a first replicate API request to the first data centered identified by the policy. The first replicate API request may be associated with a timeout period for which to receive a response. If a response is not received within the timeout period by the device, the device may send out a second replicate API request to the second data center identified by the policy. The method may include the device communicating replicate API requests to each of the data centers identified by the policies. The method may further include communicating a response from the device to the requestor.

An aspect provides a system for replicating calls to different data centers. The system may include a device with one or more processors coupled to memory. The device may be intermediary to one or more requestors and one or more data centers. The data centers may provide a service. The device may be configured to receive an application programming interface (API) request to access a service. The request may be from a requestor. The device may be configured to identify a policy for the request. The policy may identify whether the API request is idempotent. The policy may further identify one or more rules identifying one or more data centers to which to replicate the API request. The device may be configured to determine, based on the policy, whether the API request is idempotent. The device may be configured to communicate one or more replicate API requests to one or more data centers based on the determination. The device may be configured to communicate a response received requests to the requestor.

The requestor may be a client, a server, a second service or a micro service. The data centers may be located in different geographies. The API request may be to access a micro service of a plurality of micro services that are components of the service. The device may be configured to determine, based on the policy, that the API request is idempotent. The device may be configured to communicate the replicate API requests to each of the data centers identified by the policy. The device may be configured to determine, based on the policy, that the API request is not idempotent. The device may be configured to communicate a first replicate API to a first data center identified by the policy. The first replicate API request may be associated with a timeout period for which to receive a response. The device may be configured to communicate, responsive to expiration of the timeout period, a second replicate API request to a second data center identified by policy.

BRIEF DESCRIPTION OF THE DRAWING FIGURES

Objects, aspects, features and advantages of embodiments disclosed herein will become more fully apparent from the following detailed description, the appended claims and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment;

Section E describes embodiments of systems and methods for providing a service graph based platform and technology; and Section F described embodiments of systems and methods for providing transparent API call resiliency to multiple datacenters.

A. Network and Computing Environment

Figure 1A:
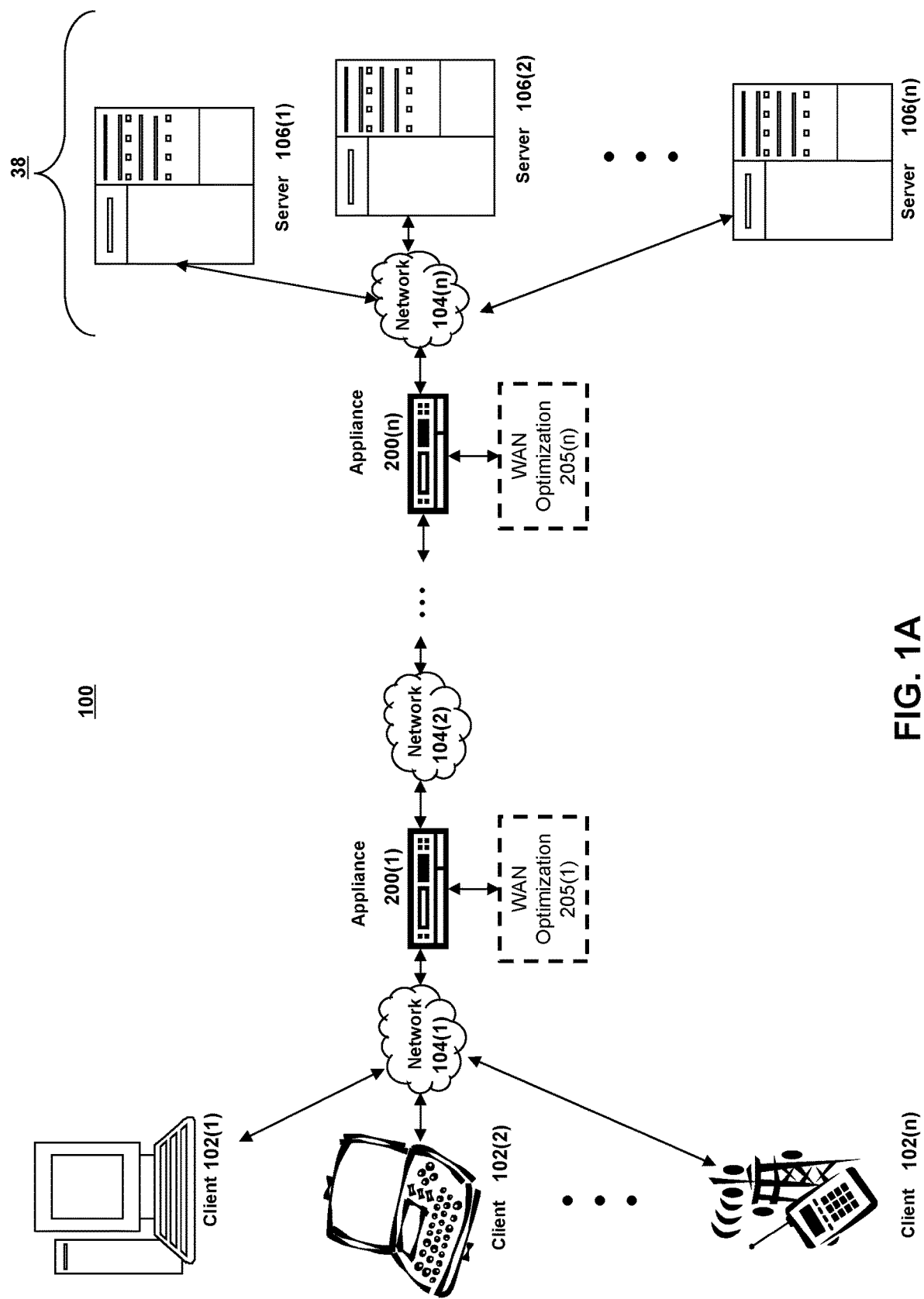
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
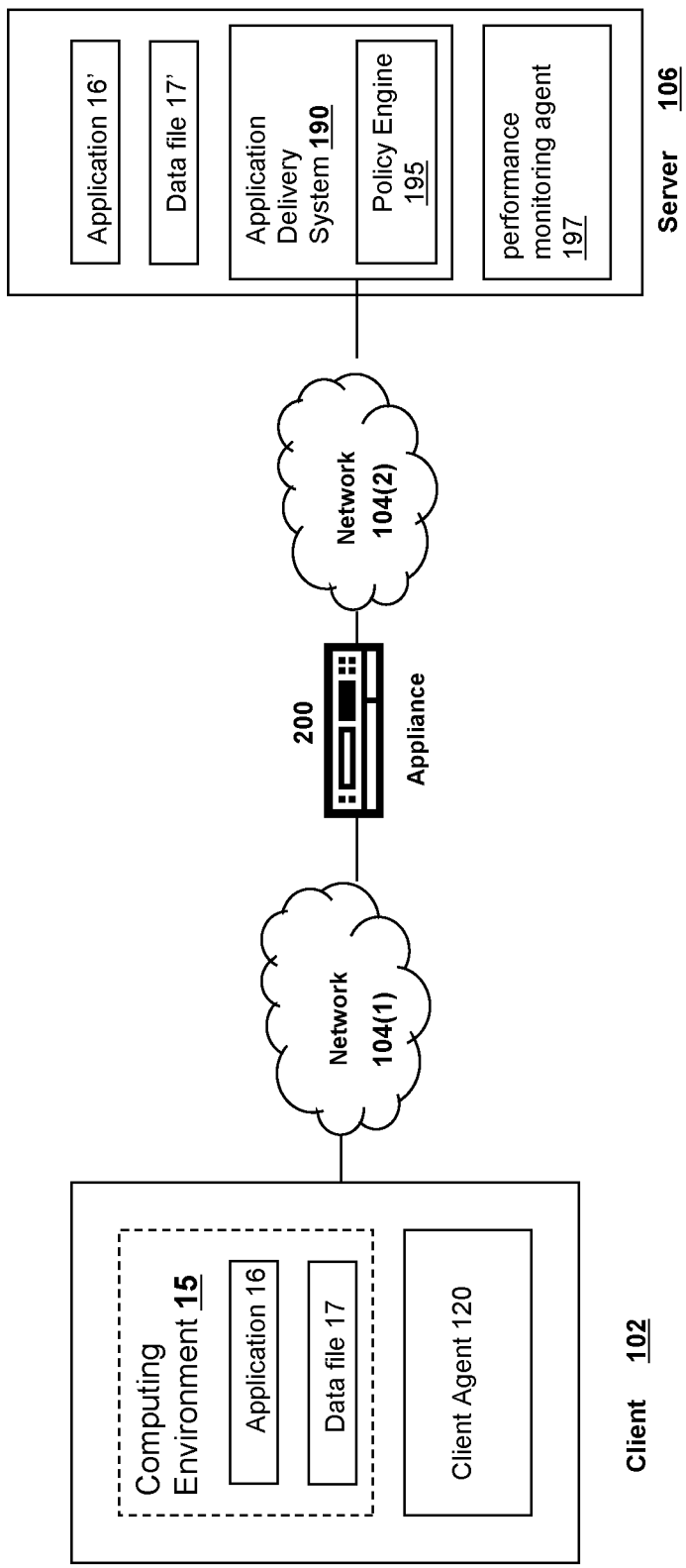
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
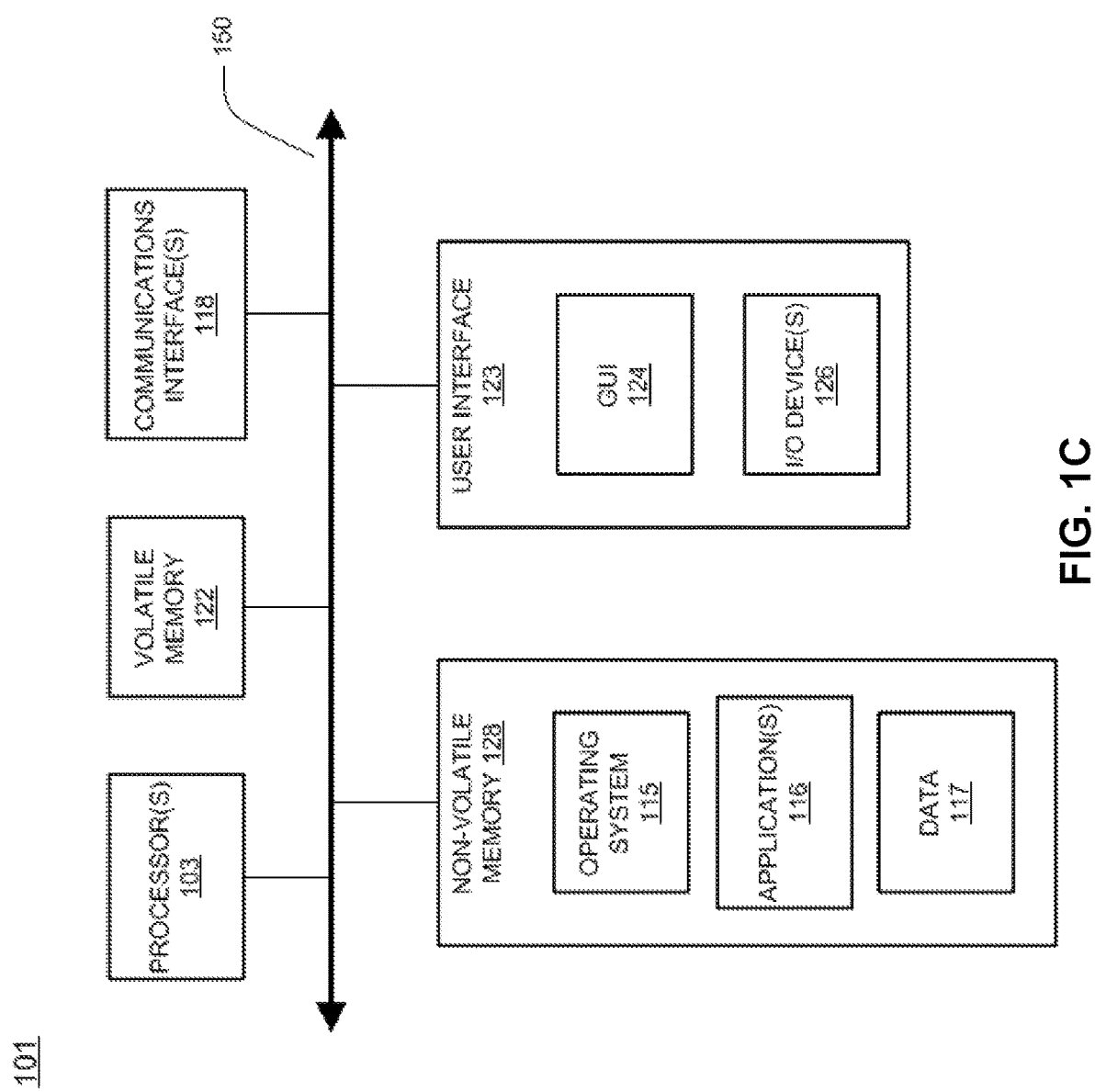
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
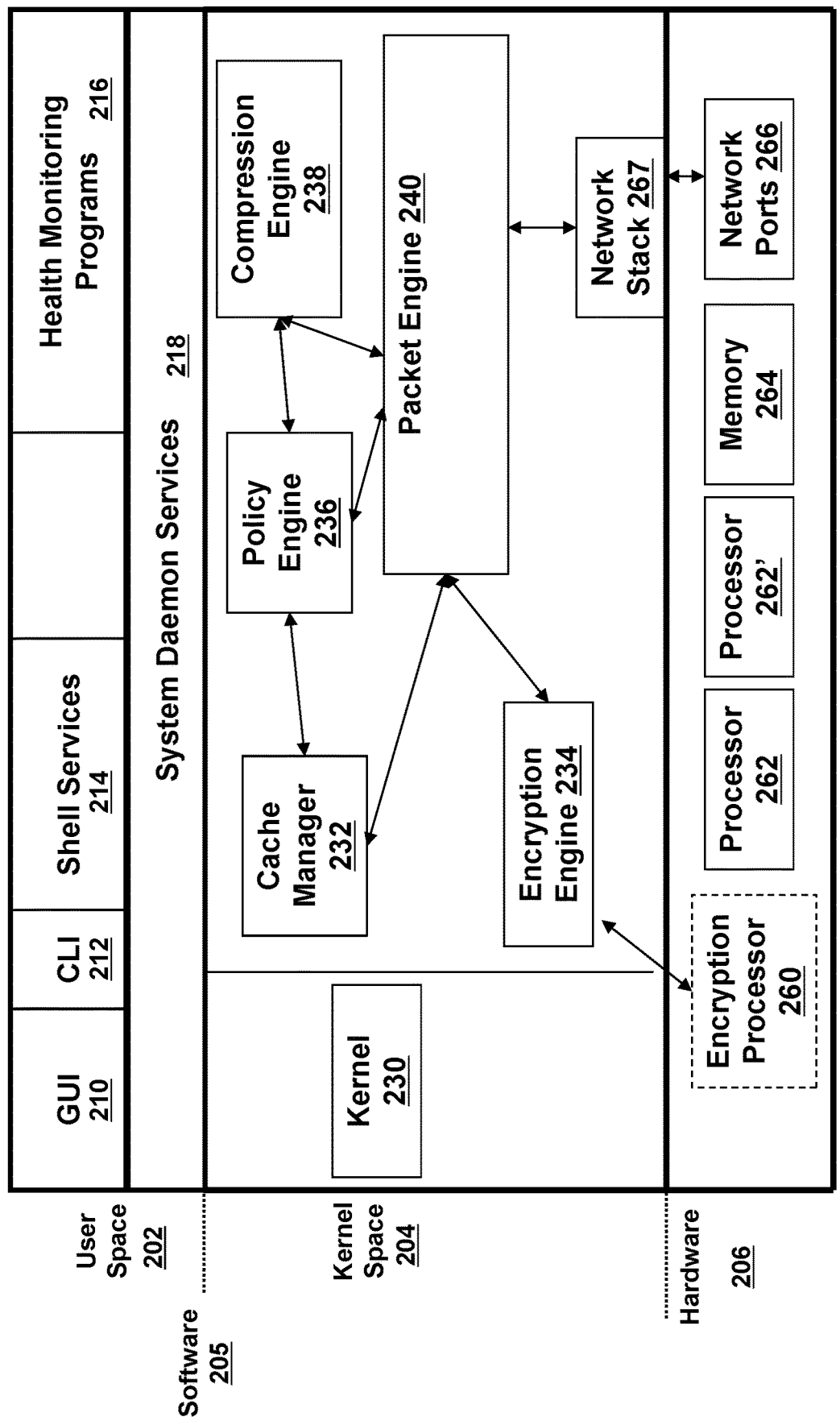
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
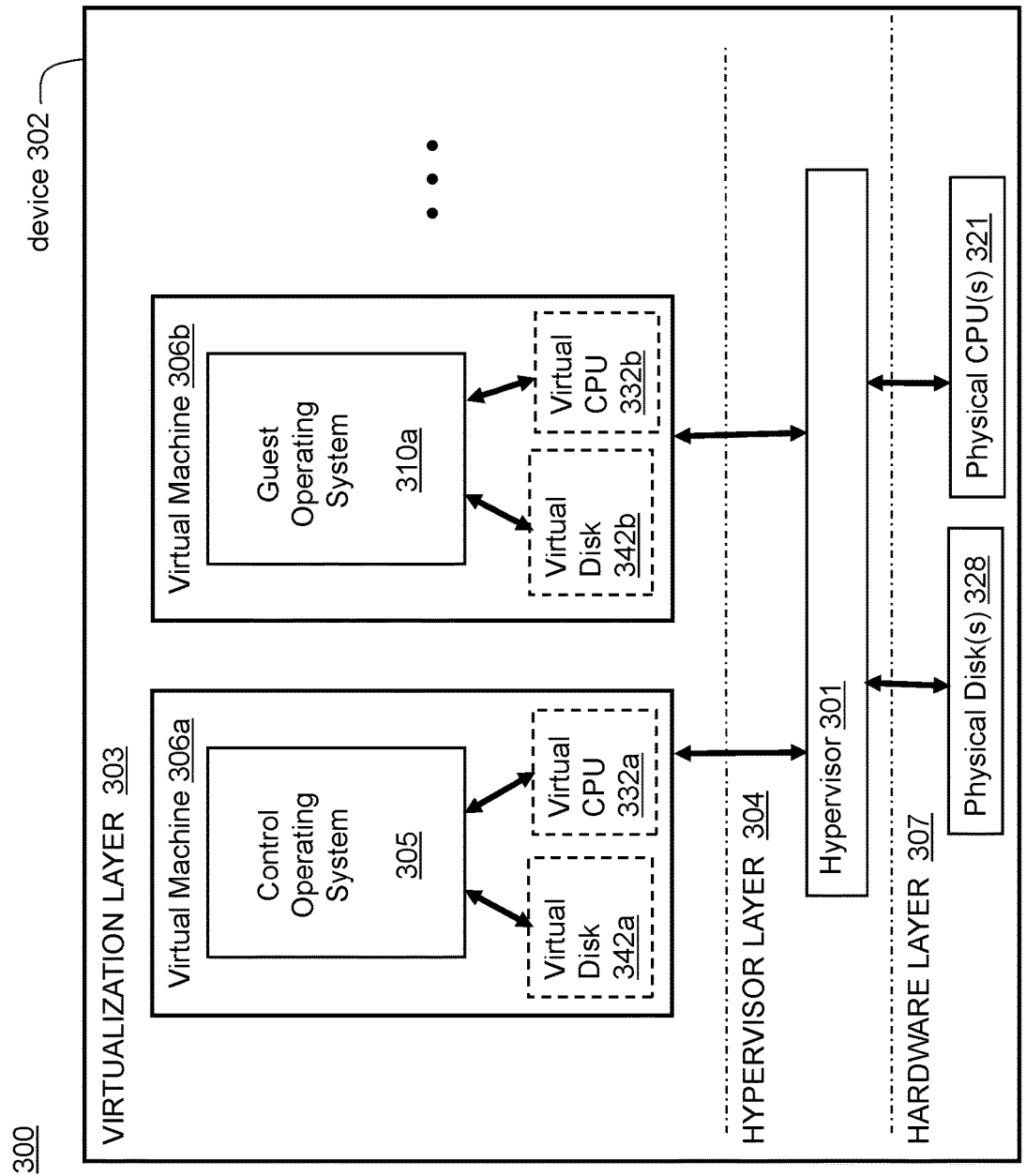
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
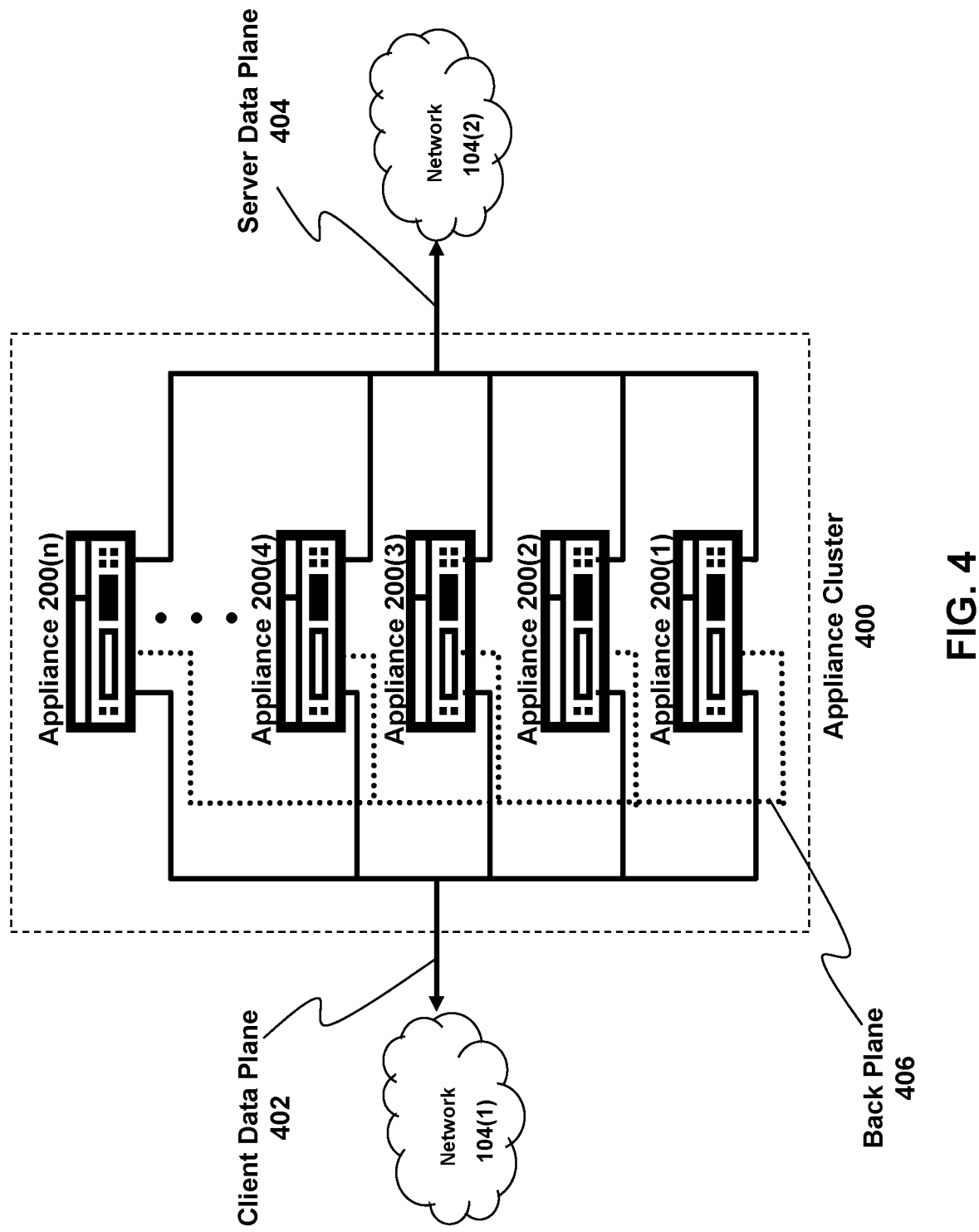
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/ cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

E. Service Graph Based Platform and Technology

Figure 5A:
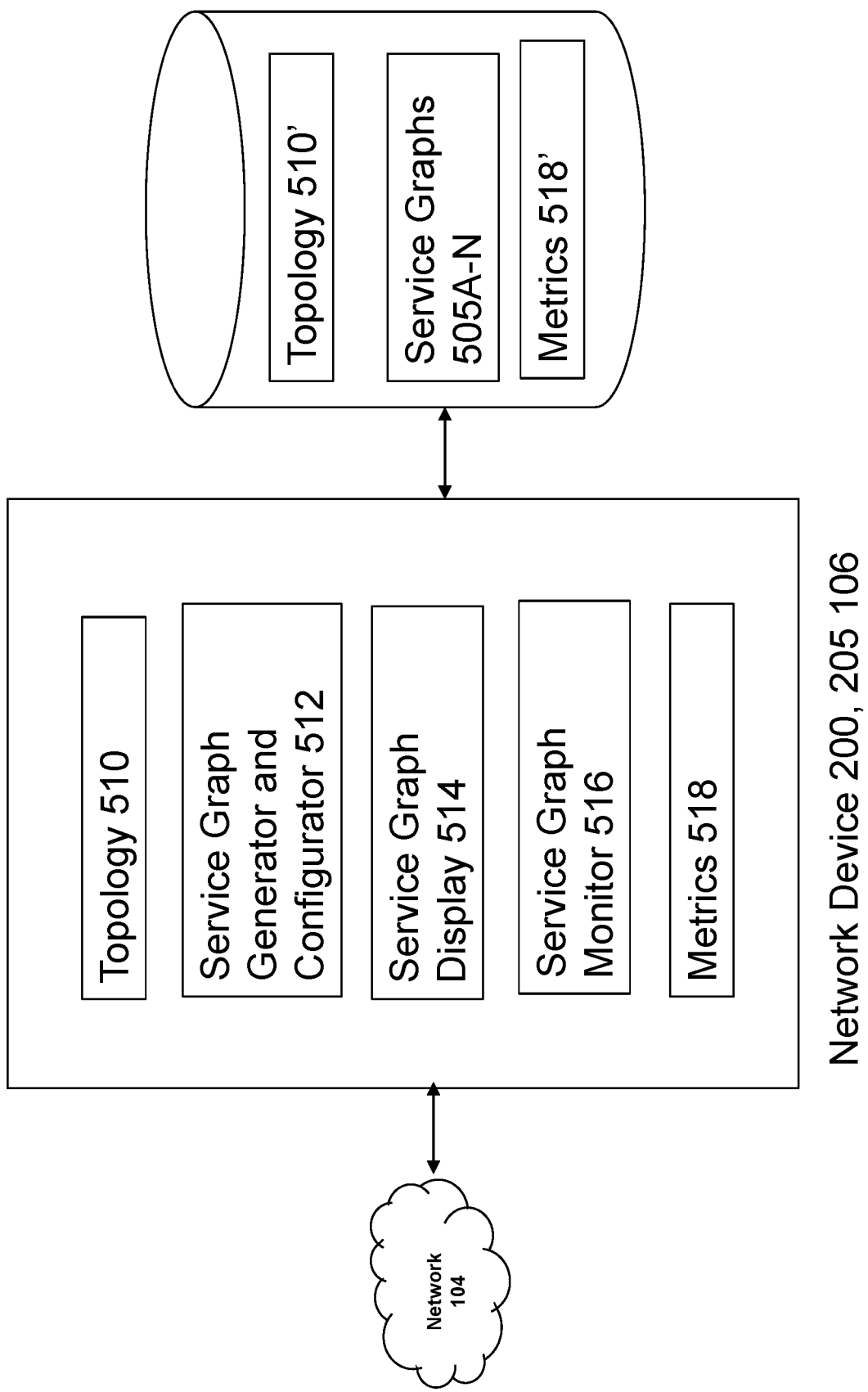
FIG. 5A is a block diagram of a service graph based system, in accordance with an illustrative embodiment.
Figure 5B:
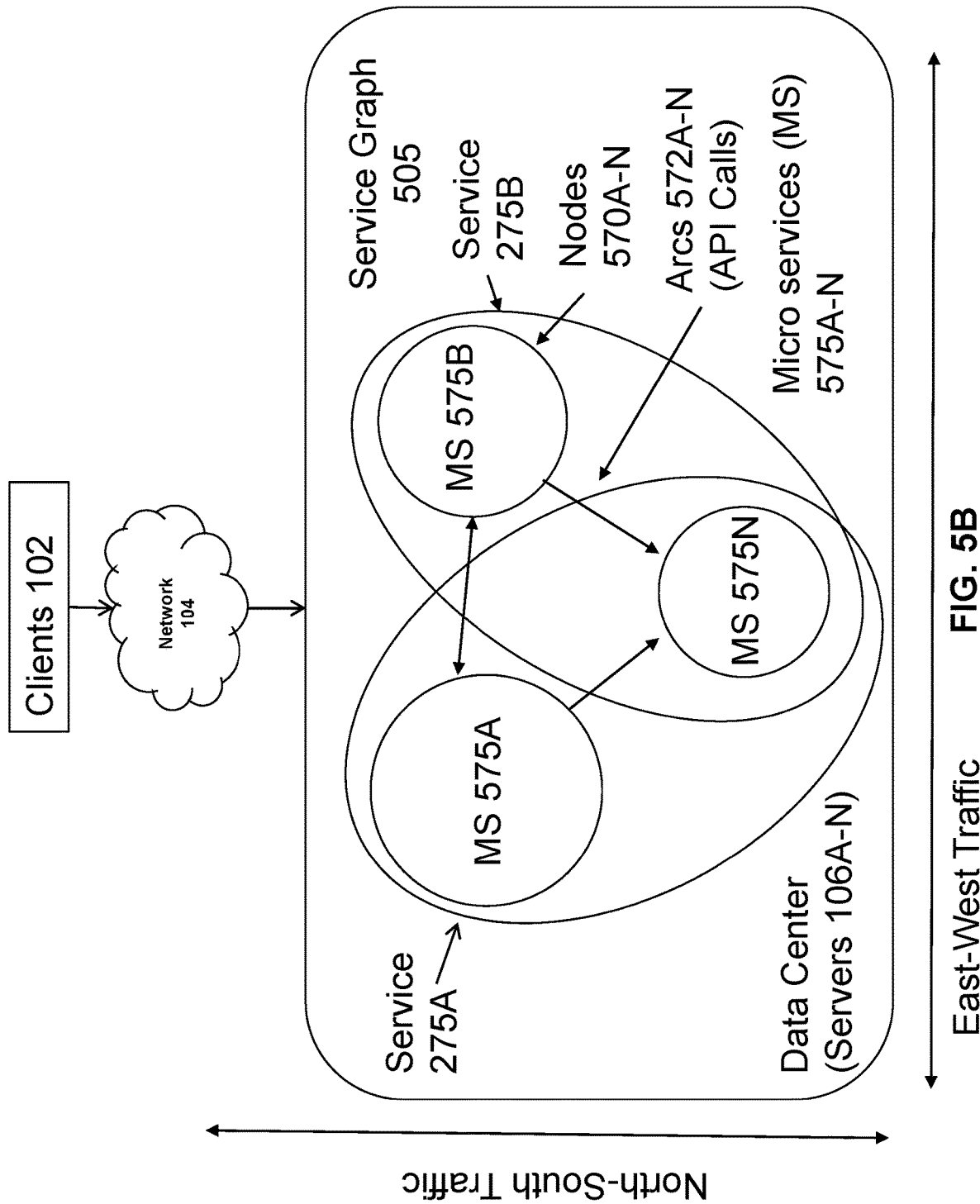
FIG. 5B is a block diagram of a service graph, in accordance with an illustrative embodiment.
Figure 5C:
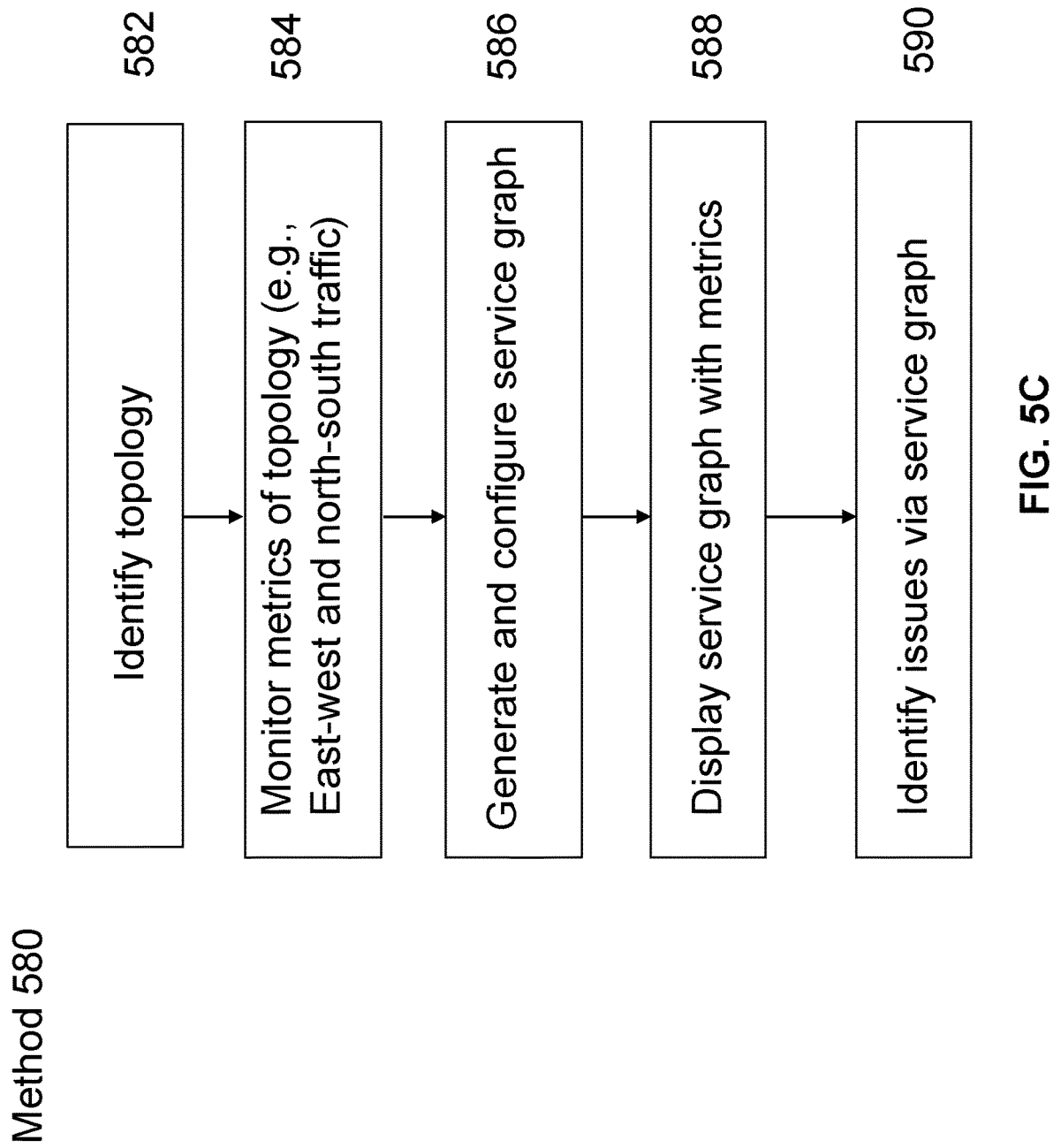
FIG. 5C is a flow diagram of a method of using a service graph, in accordance with an illustrative embodiment.

Referring now to FIGS. 5A-5C, implementation of systems and methods for a service graph based platform and technology will be discussed. A service graph is a useful technology tool for visualizing a service by its topology of components and network elements. Services may be made up of microservices with each microservice handling a particular set of one or more functions of the service. Network traffic may traverse the service topology such as a client communicating with a server to access service (e.g., north-south traffic). Network traffic of a service may include network traffic communicated between microservices of the services such as within a data center or between data centers (e.g., east-west traffic). The service graph may be used to identify and provide metrics of such network traffic of the service as well as operation and performance of any network elements used to provide the service. Service graphs may be used for identifying and determining issues with the service and which part of the topology causing the issue. Services graphs may be used to provide for administering, managing and configuring of services to improve operational performance of such services.

Referring to FIG. 5A, an implementation of a system for service graphs, such as those illustrated in FIG. 5B, will be described. A device on a network, such as a network device 200, 205 or a server 206, may include a service graph generator and configurator 512, a service graph display 514 and service graph monitor 516. The service graph generator and configurator 512 (generally referred to as service graph generator 512), may identify a topology 510 of elements in the network and metrics 518 related to the network and the elements, to generate and/or configure service graphs 505A-N. The service graphs 505A-N (generally referred to as service graphs 505) may be stored in one or more databases, with any of the metric 518' and/or topology 510'. The service graphic generator 512 may generate data of the service graphs 505 to be displayed in a display or rendered form such as via a user interface, generated referred to as service graph display 514. Service graph monitor 516 may monitor the network elements of the topology and service for metrics 518 to configure and generate a service graph 505 and/or to update dynamically or in real-time the elements and metrics 518 of or represented by a service graph display 514.

The topology 510 may include data identifying, describing, specifying or otherwise representing any elements used, traversed in accessing any one or more services or otherwise included with or part of such one or more services, such as any of the services 275 described herein. The topology may include data identifying or describing any one or more networks and network elements traversed to access or use the services, including any network devices, routers, switches, gateways, proxies, appliances, network connections or links, Internet Service Providers (ISPs), etc. The topology may include data identifying or describing any one or more applications, software, programs, services, processes, tasks or functions that are used or traversed in accessing a service. In some implementations, a service may be made up or include multiple microservices, each providing one or more functions, functionality or operations of or for a service. The topology may include data identifying or describing any one or more components of a service, such as programs, functions, applications or microservices used to provide the service. The topology may include parameters, configuration data and/or metadata about any portion of the topology, such as any element of the topology.

A service graph 505 may include data representing the topology of a service 275, such any elements making up such a service or used by the service, for example as illustrated in FIG. 5B. The service graph may be in a node base form, such as graphical form of nodes and each node representing an element or function of the topology of the service. A service graph may represent the topology of a service using nodes connected among each other via various connectors or links, which may be referred to as arcs. The arc may identify a relationship between elements connected by the arc. Nodes and arcs may be arranged in a manner to identify or describe one or more services. Nodes and arcs may be arranged in a manner to identify or describe functions provided by the one or more services. For example, a function node may represent a function that is applied to the traffic, such as a transform (SSL termination, VPN gateway), filter (firewalls), or terminal (intrusion detection systems). A function within the service graph might use one or more parameters and have one or more connectors.

The service graph may include any combination of nodes and arcs to represent a service, topology or portions thereof. Nodes and arcs may be arranged in a manner to identify or describe the physical and/or logical deployment of the service and any elements used to access the service. Nodes and arcs may be arranged in a manner to identify or describe the flow of network traffic in accessing or using a service. Nodes and arcs may be arranged in a manner to identify or describe the components of a service, such as multiple microservices that communicate with each other to provide functionality of the service. The service graph may be stored in storage such as a database in a manner in order for the service graph generator to generate a service graph in memory and/or render the service graph in display form 514.

The service graph generator 512 may include an application, program, library, script, service, process, task or any type and form of executable instructions for establishing, creating, generating, implementing, configuring or updating a service graph 505. The service graph generator may read and/or write data representing the service graph to a database, file or other type of storage. The service graph generator may comprise logic, functions and operations to construct the arrangement of nodes and arcs to have an electronic representation of the service graph in memory. The service graph generator may read or access the data in the database and store data into data structures and memory elements to provide or implement a node based representation of the service graph that can be updated or modified. The service graph generator may use any information from the topology to generate a service graph. The service graph generator may make network calls or use discovery protocols to identify the topology or any portions thereof. The service graph generator may use any metrics, such as in memory or storage or from other devices, to generate a service graph. The service graph generator may comprise logic, functions and operations to construct the arrangement of nodes and arcs to provide a graphical or visual representation of the service graph, such as on a user interface of a display device. The service graph generator may comprise logic, functions and operations to configure any node or arc of the service graph to represent a configuration or parameter of the corresponding or underlying element represented by the node or arc. The service graph generator may comprise logic, functions and operations to include, identify or provide metrics in connection with or as part of the arrangement of nodes and arcs of the service graph display. The service graph generator may comprise an application programming interface (API) for programs, applications, services, tasks, processes or systems to create, modify or interact with a service graph.

The service graph display 514 may include any graphical or electronic representation of a service graph 505 for rendering or display on any type and form of display device. The service graph display may be rendered in visual form to have any type of color, shape, size or other graphical indicators of the nodes and arcs of the service graph to represent a state or status of the respective elements. The service graph display may be rendered in visual form to have any type of color, shape, size or other graphical indicators of the nodes and arcs of the service graph to represent a state or status of one or more metrics. The service graph display may comprise any type of user interface, such as a dashboard, that provides the visual form of the service graph. The service graph display may include any type and form of user interface elements to allow users to interact, interface or manipulate a service graph. Portion of the service graph display may be selectable to identify information, such as metrics or topology information about that portion of the service graph. Portions of the service graph display may provide user interface elements for users to take an action with respect to the service graph or portion thereof, such as to modify a configuration or parameter of the element.

The service graph monitor 518 may include an application, program, library, script, service, process, task or any type and form of executable instructions to receive, identify, process metrics 518 of the topology 510. The service graph monitor 518 monitors via metrics 518 the configuration, performance and operation of elements of a service graph. The service graph monitor may obtain metrics from one or more devices on the network. The service graph monitor may identify or generate metrics from network traffic traversing the device(s) of the service graph monitor. The service graph monitor may receive reports of metrics from any of the elements of the topology, such as any elements represented by a node in the service graph. The service graph monitor may receive reports of metrics from the service. From the metrics, the service graph monitor may determine the state, status or condition of an element represented in or by the service graph, such as by a node of the service graph. From the metrics, the service graph monitor may determine the state, status or condition of network traffic or network connected represented in or by the service graph, such as by an arc of the service graph. The service graph generator and/or service graph monitor may update the service graph display, such as continuously or in predetermined frequencies or event based, with any metrics or any changed in the state, status or condition of a node or arc, element represented by the node or arc, the service, network or network traffic traversing the topology.

The metrics 518, 518' (generally referred to as metrics 518) may be stored on network device in FIG. 5B, such as in memory or storage. The metrics 518, 518' may be stored in a database on the same device or over a network to another device, such as a server. Metrics may include any type and form of measurement of any element of the topology, service or network. Metrics may include metrics on volume, rate or timing of requests or responses received, transmitted or traversing the network element represented by the node or arc. A Metrics may include metrics on usage of a resource by the element represented by the node or arc, such as memory, bandwidth. Metrics may include metrics on performance and operation of a service, including any components or microservices of the service, such as rate of response, transaction responses and times.

FIG. 5B illustrates an implementation of a service graph in connection with micro-services of a service in view of east-west network traffic and north-south network traffic. In brief overview, clients 102 may access via one or more networks 104 a data center having servers 106A-106N (generally referred to as servers 106) providing one or more services 275A-275N (generally referred to as services 275). The services may be made up multiple microservices 575A-575N (generally referred to as microservice or micro service 575). Service 275A may include microservice 575A and 575N while service 275B may include microservice 575B and 575N. The microservices may communicate among the microservices via application programming interface (APIs). A service graph 505 may represent a topology of the services and metrics on network traffic, such as east-west network traffic and north-south network traffic.

North-south network traffic generally describes and is related to network traffic between clients and servers, such as client via networks 104 to servers of data center and/or servers to clients via network 104 as shown in FIG. 5B.

East-west network traffic generally describes and is related to network traffic between elements in the data centers, such as data center to data center, server to server, service to service or microservice to microservice.

A service 275 may comprise microservices 575. In some aspects, microservices is a form of service-oriented architecture style wherein applications are built as a collection of different smaller services rather than one whole or singular application (referred to sometimes as a monolithic application). Instead of a monolithic application, a service has several independent applications or services (e.g., microservices) that can run on their own and may be created using different coding or programming languages. As such, a larger server can be made up of simpler and independent programs or services that are executable by themselves. These smaller programs or services are grouped together to deliver the functionalities of the larger service. In some aspects, a microservices based service structures an application as a collection of services that may be loosely coupled. The benefit of decomposing a service into different smaller services is that it improves modularity. This makes the application or service easier to understand, develop, test, and be resilient to changes in architecture or deployment.

A microservice includes an implementation of one or more functions or functionality. A microservice may be a self-contained piece of business function(s) with clear or established interfaces, such as an application programming interface (API). In some implementations, a microservice may be deployed in a virtual machine or a container. A service may use one or more functions on one microservice and another one or more functions of a different microservice. In operating or executing a service, one microservice may make API calls to another microservice and the microservice may provide a response via an API call, event handler or other interface mechanism. In operating or executing a microservice, the microservice may make an API call to another microservice, which in its operation or execution, makes a call to another microservice, and so on.

The service graph 505 may include multiple nodes 570A-N connected or linked via one or more or arcs 572A-572N. The service graph may have different types of nodes. A node type may be used to represent a physical network element, such as a server, client, appliance or network device. A node type may be used to represent an end point, such as a client or server. A node type may be used to represent an end point group, such as group of clients or servers. A node type may be used to represent a logical network element, such as a type of technology, software or service or a grouping or sub-grouping of elements. A node type may be used to represent a functional element, such as functionality to be provided by an element of the topology or by the service.

The configuration and/or representation of any of the nodes 570 may identify a state, a status and/or metric(s) of the element represented by the node. Graphical features of the node may identify or specify an operational or performance characteristic of the element represented by the node. A size, color or shape of the node may identify an operational state of whether the element is operational or active. A size, color or shape of the node may identify an error condition or issue with an element. A size, color or shape of the node may identify a level of volume of network traffic, a volume of request or responses received, transmitted or traversing the network element represented by the node. A size, color or shape of the node may identify a level of usage of a resource by the element represented by the node, such as memory, bandwidth, CPU or storage. A size, color or shape of the node may identify relativeness with respect to a threshold for any metric associated with the node or the element represented by the node.

The configuration and/or representation of any of the arcs 572 may identify a state, status and/or metric(s) of the element represented by the arc. Graphical features of the arc may identify or specify an operational or performance characteristic of the element represented by the arc. A size, color or shape of the node may identify an operational state of whether the network connection represented by the arc is operational or active. A size, color or shape of the arc may identify an error condition or issue with a connection associated with the arc. A size, color or shape of the arc may identify an error condition or issue with network traffic associated with the arc. A size, color or shape of the arc may identify a level of volume of network traffic, a volume of request or responses received, transmitted or traversing the network connection or link represented by the arc. A size, color or shape of the arc may identify a level of usage of a resource by network connection or traffic represented by the arc, such as bandwidth. A size, color or shape of the node may identify relativeness with respect to a threshold for any metric associated with the arc. In some implementations, a metric for the arc may include any measurement of traffic volume per arc, latency per arc or error rate per arc.

Referring now to FIG. 5C, an implementation of a method for generating and displaying a service graph will be described. In brief overview of method 580, at step 582, a topology is identified, such as for a configuration of one or more services. At step 584, the metrics of elements of the topology, such as for a service are monitored. At step 586, a service graph is generated and configured. At step 588, a service graph is displayed. At step 590, issues with configuration, operation and performance of a service or the topology may be identified or determined.

At step 582, a device identifies a topology for one or more services. The device may obtain, access or receive the topology 510 from storage, such as a database. The device may be configured with a topology for a service, such as by a user. The device may discover the topology or portions therefore via one more discovery protocols communicated over the network. The device may obtain or receive the topology or portions thereof from one or more other devices via the network. The device may identify the network elements making up one or more services. The device may identify functions providing the one or more services. The device may identify other devices or network elements providing the functions. The device may identify the network elements for north-west traffic. The device may identify the network elements for east-west traffic. The device may identify the microservices providing a service. In some implementations, the service graph generator establishes or generates a service graph based on the topology. The service graph may be stored to memory or storage.

At step 584, the metrics of elements of the topology, such as for a service are monitored. The device may receive metrics about the one or more network elements of the topology from other devices. The device may determine metrics from network traffic traversing the device. The device may receive metrics from network elements of the topology, such as via reports or events. The device may monitor the service to obtain or receive metrics about the service. The metrics may be stored in memory or storage, such as in association with a corresponding service graph. The device may associate one or more of the metrics with a corresponding node of a service graph. The device may associate one or more of the metrics with a corresponding arc of a service graph. The device may monitor and/or obtain and/or receive metrics on a scheduled or predetermined frequency. The device may monitor and/or obtain and/or receive metrics on a continuous basis, such as in real-time or dynamically when metrics change.

At step 586, a service graph is generated and configured. A service graph generator may generate a service graph based at least on the topology. A service graph generator may generate a service graph based at least on a service. A service graph generator may generate a service graph based on multiple services. A service graph generator may generate a service graph based at least on the microservices making up a service. A service graph generator may generate a service graph based on a data center, servers of the data center and/or services of the data center. A service graph generator may generate a service graph based at least on east-west traffic and corresponding network elements. A service graph generator may generate a service graph based at least on north-south traffic and corresponding network elements. A service graph generator may configure the service graph with parameters, configuration data or metadata about the elements represented by a node or arc of the service graph. The service graph may be generated automatically by the device. The service graph may be generated responsive to a request by a user, such as via a comment to or user interface of the device.

At step 588, a service graph is displayed. The device, such as via service graph generator, may create a service graph display 514 to be displayed or rendered via a display device, such as presented on a user interface. The service graph display may include visual indicators or graphical characteristics (e.g., size, shape or color) of the nodes and arcs of the service graph to identify status, state or condition of elements associated with or corresponding to a node or arc. The service graph display may be displayed or presented via a dashboard or other user interface in which a user may monitor the status of the service and topology. The service graph display may be updated to show changes in metrics or the status, state and/or condition of the service, the topology or any elements thereof. Via the service graph display, a user may interface or interact with the service graph to discover information, data and details about any of the network elements, such as the metrics of a microservice of a service.

At step 590, issues with configuration, operation and performance of a service or the topology may be identified or determined. The device may determine issues with the configuration, operation or performance of a service by comparing metrics of the service to thresholds. The device may determine issues with the configuration, operation or performance of a service by comparing metrics of the service to previous or historical values. The device may determine issues with the configuration, operation or performance of a service by identifying a change in a metric. The device may determine issues with the configuration, operation or performance of a service by identifying a change in a status, state or condition of a node or arc or elements represented by the node or arc. The device may change the configuration and/or parameters of the service graph. The device may change the configuration of the service. The device may change the configuration of the topology. The device may change the configuration of network elements making up the topology or the service. A user may determine issues with the configuration, operation or performance of a service by reviewing, exploring or interacting with the service graph display and any metrics. The user may change the configuration and/or parameters of the service graph. The user may change the configuration of the service. The user may change the configuration of the topology. The device may change the configuration of network elements making up the topology or the service.

F. Systems and Methods For Transparent Resiliency to Multiple Data Centers

Figure 6A:
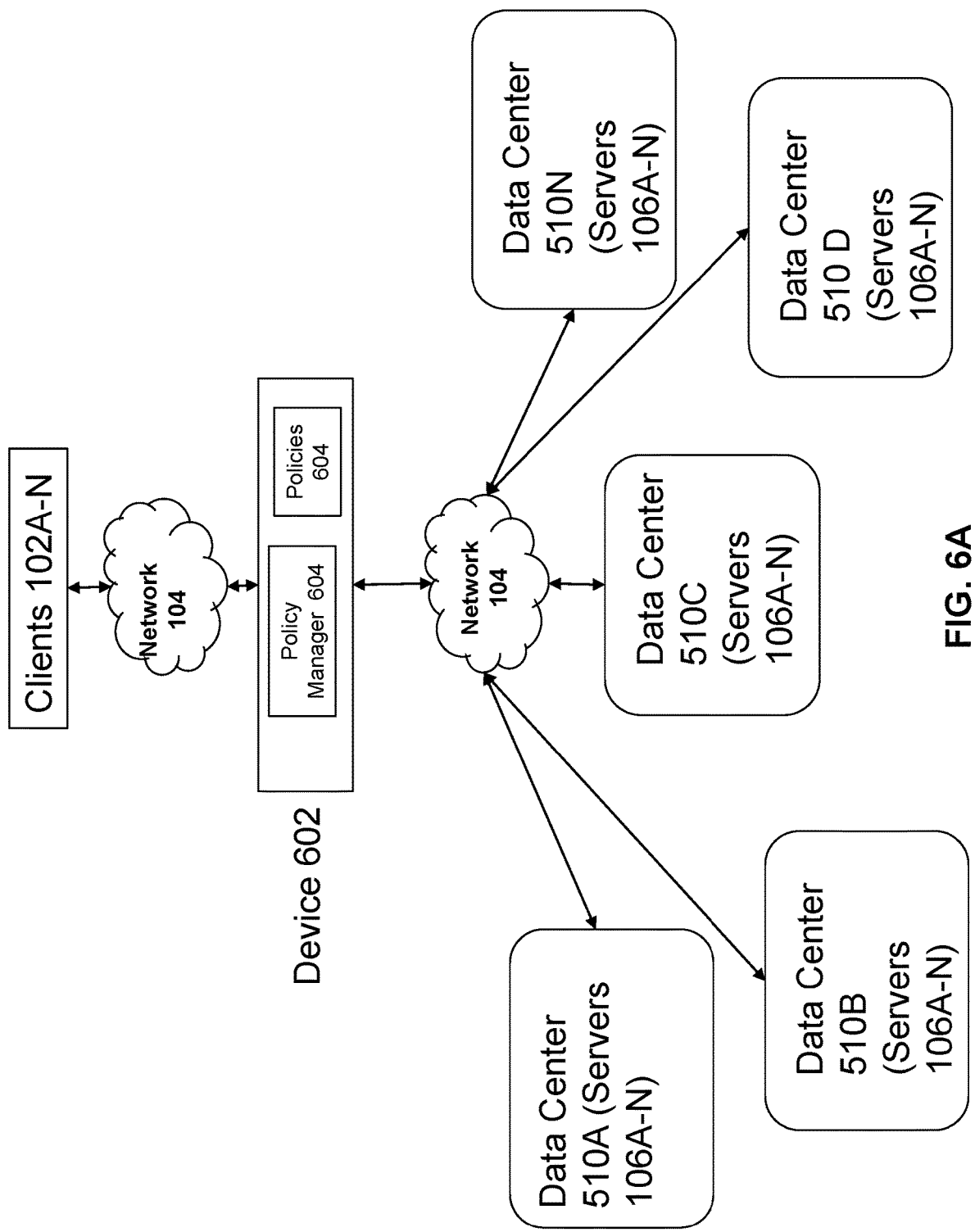
FIG. 6A is a block diagram of a service graph for an idempotent call, in accordance with an illustrative embodiment.
Figure 6B:
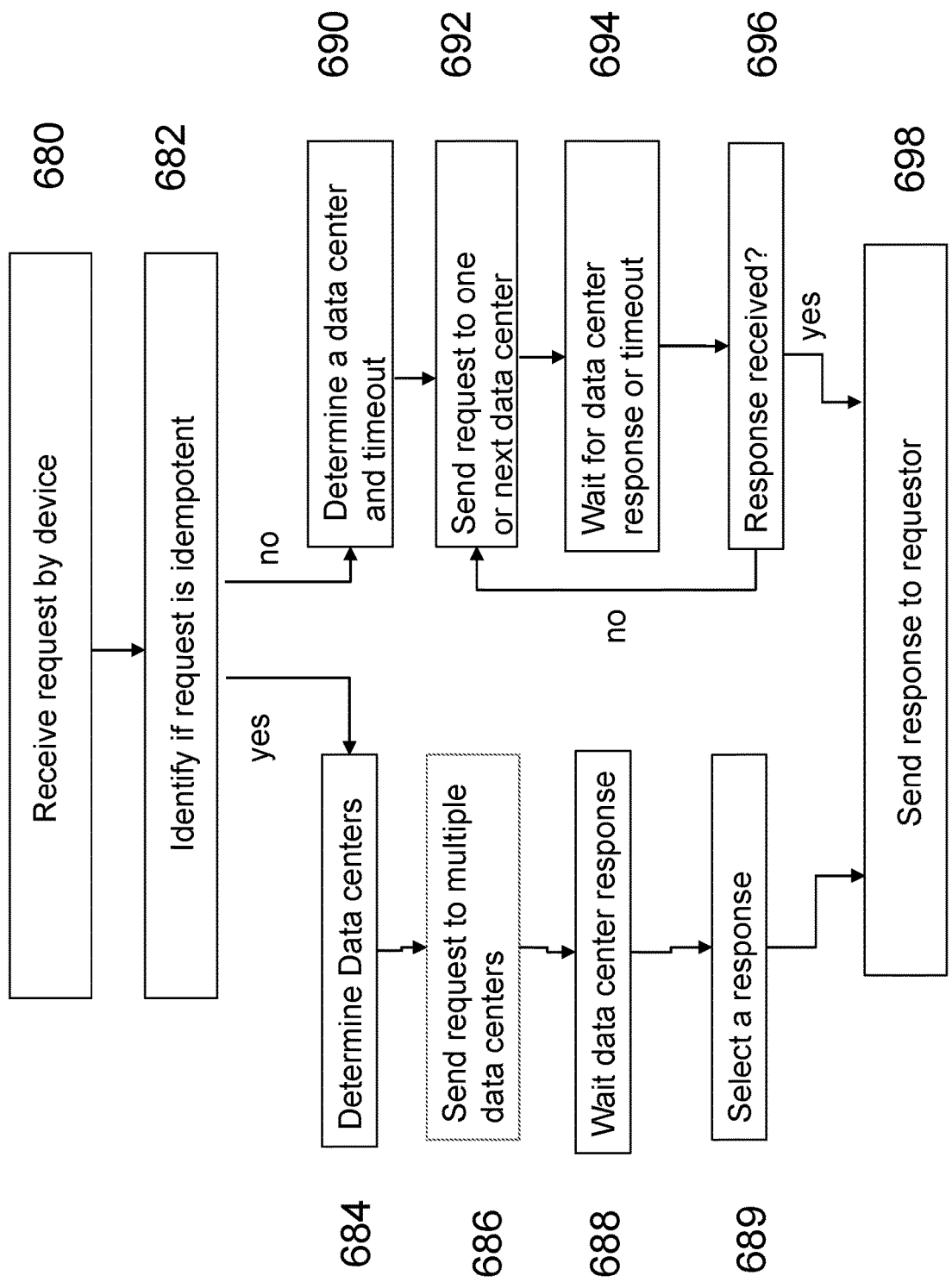
FIG. 6B is a flow diagram of a method of using a service graph, in accordance with an illustrative embodiment.

FIGS. 6A and 6B depict systems and methods for transparent resiliency to multiple data centers. The systems and methods depicted determine if an API call is idempotent. If the API call is idempotent, the calls can be concurrently routed to multiple data centers. If the API call is not idempotent, a call can be sent to one data center at a time until a response is received or timeout occurs. Automatically providing multi-region data center calls for either idempotent API calls or non-idempotent API calls provides a faster response time during data center or regional failures. Automatically providing multi-region calls at the server side moves the logic out of the client and into a transparent and centrally managed service. This can allow business logic to focus on core logic and not on logic to retry requests or manage the multi-regional aspect of a dependent service.

FIG. 6A depicts an example implementation of a service graph for providing transparent resiliency for idempotent and non-idempotent API calls. In brief overview, clients 102 may access via one or more networks 104 one or more servers 106A-106N (servers 106) in one more data centers 510A-510N (generally referred herein as data centers 510), such as by sending a request via device 602. The request may be in the form of an API request or API call, such as to a service or microservice. A policy manager 605 of the device 602 may access policies 604 to determine whether the request is idempotent and to provide configuration for communicating the API request to one or more data centers 510 510.

A request is idempotent if the request can be fulfilled multiple times without changing the result beyond the initial application. If an API call is idempotent, multiple API calls and responses result in the same response as a single API call and response. This allows multiple API calls to be sent concurrently without the concern of multiple responses changing the output. This property can be used to build redundancy and resiliency in a system and decrease lag time by sending out a request to multiple data centers 510 concurrently instead of sequentially.

The system may include clients 102. A client 102 102 may initiate an API call over the network 104 104 to access a server in a data centers 510, such as via device 602. The client 102 may make an API call to a service 275 executing on a server. The client 102 may make an API call to a microservice 575 executing as part of a service of a server. Although shown as a client 102 in FIG. 6A, the requestor may be a server, such as a server in another data center. The requester may be a service or a micro service 575, such as one micro service 575 making a call to another micro service 575 across data, centers. In some embodiments, the request is directed to or destined to the device 602. In some embodiments, the request is directed to or destined to a server and intercepted or received by the device 602.

The system may further include data centers 510, for example data centers 510 510A-E. Each data center 510 has a plurality of servers 106A-106N (generally referred to as servers 106) providing one or more services 275A-275N (generally referred to as services 275). The services may be made up of multiple micro service 575s 575A-575N (generally referred to as micro service 575 or micro service 575 575). Service 275A may include micro service 575 575A and 575N while service 275B may include micro service 575

575B and 575N. The micro service 575s may communicate among the micro service 575s via application programming interface (APIs).

Any of the client 102s may access the device 602 and/or data centers 510 via one or more network 104s 104. Although the embodiment shown in FIG. 6A shows one or more networks 104 between clients 102 and device 602, in other embodiments, clients 102 and device 602 may be on the same network 104. Although the embodiment shown in FIG. 6A shows one or more networks 104 between device 602 and data centers 510, in other embodiments, device 602 and data centers 510 may be on the same network 104. The various networks 104 may be the same type of network 104 or different types of network 104. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless network 104s, and may employ one or more communication transport protocols, such as transmission control protocol (TCP), internet protocol (IP), user datagram protocol (UDP) or other similar protocols.

The system may include a device 602. The device 602 may be implemented as a server 106, gateway, router, switch, bridge, proxy or other type of computing or network device. The device 602 may be any embodiments of appliance or intermediary device 200 described herein. The device 602 may be deployed intermediary to clients 102 and servers 106.

The device 602 may include a policy manager 604 and one or more policies 604 for processing any of the API calls from any clients 102. The policy manager 604 of the device 602 may use the policies 604 to determine whether an API call is idempotent or not and to process the API call accordingly. Via the policy manager 604 and the policies 604, the device 602 may determine which one or more data centers 510 to forward the API call and receive a response to the API call.

The policy manager 604 may comprise an application, program, service, task, script, process, and/or any type and form of executable instructions to apply one or more policies 604 to one or more requests. In some embodiments, the policy manager 604 may be or include the policy engine 236 described elsewhere herein. In some embodiments, the policy manager 604 may be incorporated as part of a virtual server 106 of the device 602. The policy manager 604 may implement logic, rules and/or functionality to apply one or more policies 604 to a request such as to determine if the request is idempotent and how to process the request accordingly.

The policy manager 604 may use policies 604 to determine how to send requests to data centers 510. The policies 604 may determine that the device 602 makes replicate API calls and forwards them to data centers 510 concurrently. The policies 604 may determine that the device 602 makes replicate API calls and forward them to data centers 510 sequentially after a timeout period. The policies 604 may identify the data centers 510 to be sent the replicate API calls. The data centers 510 may be identified based on the latency of data centers 510 or geography location of data centers 510. If the requests are sent sequentially, the policies 604 may order the selected data centers 510 to determine the order in which they are forwarded requests. The policies 604 may order the selected data centers 510 based on their geographic location or the latency of the data center.

A policy 604 may be configured to be used by the policy manager 604 to identify whether a request is idempotent. The policy 604 may include one or more parameters configured to identify a name of a request, such as the name of the API call and whether the request is idempotent or not. In some embodiments, the request may designate that it is an idempotent request, for instance, the policies 604 may identify a field in the request indicating the request is idempotent. The policy 604 may be configured with one or more rules for identification of data centers 510(s) to use for the API request, such as an ordered list of data centers 510. The policy 604 may be configured with a rule, parameter or setting to indicate or instruct the device 602 to select and use data centers 510 based on geography (e.g., closest first). The policy 604 may be configured with a rule, parameter or setting to indicate or instruct the device 602 to select and use data centers 510 based on latency (e.g., fastest first).

In some embodiments, the policy manager 604 may compare the request to a set of known idempotent requests. Known idempotent requests may be stored in a data structure such as a class, list or array. In some embodiment, the device 602 may test or monitor a request for idempotency and if identified as such store or configure the device 602 to identify the API call of the request as idempotent.

The policy manager 604 may determine from the policy 604 the identity of data centers 510 to which to route the request from the client 102. The data centers 510 may be identified by a user, such as an administrator. The data centers 510 may be identified by a set of one or more policies 604. The data centers 510 may be identified based on the latency of the data center 510. The data centers 510 may be identified based on the location of the data center 510. The data centers 510 may be selected based on a threshold latency value. For example, any data center 510 below a specified threshold latency value may be selected. The identity of the data centers 510 used may be different if the request is idempotent. For example, a request that is idempotent may have higher tolerance for a higher threshold latency value per data center 510 while still maintaining adequate client 102 response time based on concurrently forwarding the request to multiple data centers 510.

The selected data centers 510 may be randomly ordered or ordered based on one or more policies 604. The order of data centers 510 may be configured by a user, such as an administrator. The order of data centers 510 may be automatically determined at the time of the request by the device 602, such as based on monitoring a status, performance or operation of the data centers 510, such as via one or more metrics. The order of data centers 510 may be based on the latency of the data center. For example, the data center 510 with the shortest latency may be ordered first. The data centers 510 may be ordered based on the geographic location of the data center. For example, the data centers 510 in geographic proximity to the device 602 may be selected. In some instances, the data center 510 that is geographically closest to the device 602 may be ordered first Policies 604 may be used to determine the time at which the device 602 forwards the request to a selected data center 510. For example, policies 604 may determine that idempotent requests are sent concurrently while requests that are not idempotent are sent sequentially if a response is not received within a wait time or an expired timeout period.

A policy 604 may be configured to be used by the policy manager 604 to identify any applicable timeout periods. A timeout period may be used in the case of sequential, non-idempotent API calls to determine when to forward a replicate API call to the next selected data center in the set of ordered, selected data centers 510. A timeout period may be used in both idempotent and non-idempotent API calls to determine that a request or set of requests have failed to solicit a response from one or more data centers 510. Timeout periods may be specified or configured for each data center 510 and in some cases, may be different across data centers 510.

In an idempotent request, the device 602 may forward the API call concurrently to multiple data centers 510, such as by replicating the API calls of the request or otherwise replicating the request. The device 602 may use the first response received to any of the replicate API requests from any of the data centers 510 to forward back to the client 102. The data centers 510 selected may be different if the request is idempotent. For instance, if the request is idempotent, the policy manager 604 may allow selection of data centers 510 that have a longer latency for response than the policy manager 604 allows for data centers 510 selected to forward a request that is not idempotent.

If the device 602 receives multiple responses from the data centers 510, policies 604 may determine which response is used to respond to the client 102. This may happen, for example, if the device 602 sends requests to multiple data centers 510 concurrently. For instance, if a request is idempotent and the device 602 communicates the request to multiple data centers 510 concurrently, the device 602 may receive multiple responses back from the multiple data centers 510. Policies 604 may determine to use the first response as the response to the request. Policies 604 may determine to use the last response within a specified timespan. Policies 604 may select the response based on which of the responses is successful. Policies 604 may determine to compare multiple responses and use the most frequently occurring response. Policies 604 may determine a range or type of expected responses for the request and use the first response that falls within the expected range or type of expected responses.

If the API call is not idempotent, the device 602 may forward the API call to a selected one of the data centers 510 and wait for a response until the expiration of a timeout period. If the timeout period expires, the device 602 may forward the API call to another selected data center 510, such as by replicating the API call or request, and so on until the device 602 receives a response. If the device 602 receives a response, the device 602 may use the response to respond to the client 102 request. Policies 604 may determine a second data center 510 or set of data centers 510 to send the request to if a response from a first data center 510 is not received within the timeout period. Policies 604 may determine the timeout out period for which the device 602 will wait for a response before forwarding a copy of the request to a second data center 510.

If the request is idempotent, policies 604 may determine to relay the request to multiple data centers 510 concurrently. Policies 604 may determine the multiple data centers 510 to which to send the requests concurrently. If the request is not idempotent, policies 604 may determine a data center to send the request to and a timeout period to wait for the response.

If a request or set of requests fail to solicit a response from one or more data centers 510, the policy may retry the request or set of requests. The policy may determine to repeat the request or set of requests to the same data center 510 or set of data centers 510. If the policy determines to repeat the request or set of requests to a different set of data centers 510, the policy may use the same set of rules to select the second set of data centers 510—e.g. optimizing for the current minimum latency in a data center and then for geographic location—or the policy may use a different set of rules to select the second set of data centers 510. The policies 604 may limit the number of times a particular data center 510 is selected. The policies 604 may limit the number of times a particular data center 510 is selected over the course of a specified timespan.

Policies 604 may determine a number of retries to make for a client 102 request. The policies 604 may determine what to do if the maximum number of retries have been made with no response from a data center. For instance, the policies 604 may determine that the request should not be retried. The policies 604 may determine the request should be retried with or without a delay and to which data centers 510 the request should be communicated on the retry. The policies 604 may determine that an error message should be sent to the client 102 or another entity when a maximum number of retries have occurred with no response. The policies 604 may determine that the request should be put on a list of failed requests or quarantined.

FIG. 6B depicts an example method for transparent resiliency to multiple data centers 510. At step 680, the device 602 receives a request over the network 104 from a requestor, such as a client 102 or server 106. At step 682, the device 602 determines whether the API call of the request is idempotent or not. If the request is idempotent, the method proceeds to step 684. If the request is not idempotent, the method proceeds to step 690.

If the request is idempotent, at step 684, the device 602 determines a plurality of data centers 510 to concurrently send the request. At step 686, the device 602 sends the request to the selected plurality of data centers 510 concurrently. At step 688, the device 602 waits for one or more response from one or more of the selected plurality of data centers 510. At step 689, the device 602 selects a response from the one or more received responses. At step 698, the device 602 sends the selected response to the requestor.

If the request is not idempotent, the method proceeds to step 690. At step 690, the device 602 determines the one or more data centers 510 to send the API request and timeout period(s) to wait for a response. At step 694, the device 602 waits to receive a response from the first data center until the timeout period has expired. At step 696, the device 602 determines if a response has been received from the data center before the time the timeout value has expired. If the device 602 receives a response, the method may continue to step 696. If the device 602 does not receive a response, the method may return to step 692 where a request is sent to a next selected data center 510 which may be associated with a second timeout value. At step 696, if a response is received, the device 602 uses the response and at step 698, may send the response to the requesting device 602.

In further detail, at step 680, the device 602 receives a request over the network 104 from a requestor, such as a client 102 or server 106. The device 602 may receive an application programming interface (API) request to access a service. The API request may be an API request to access a micro service 575 of a plurality of micro service 575s that are components of the service. The requestor may be one of a client 102, a server 106, a second service or a micro service 575. The device 602 may be intermediary to a plurality of requestors and a plurality of data centers 510.

At step 682, the device 602 determines whether the API call of the request is idempotent or not idempotent. The device 602 may identify a policy for the request which identifies whether the API request is idempotent and which identifies one or more data centers 510 to replicate the API request. The device 602 may determine, based on the policy, that the API request is idempotent. The device 602 may determine, based on the policy, that the API request is not idempotent. The device 602 may determine the API request is idempotent based on the name of the API request or a field in the API request.

If the request is idempotent, at step 684, the device 602 determines a plurality of data centers 510 to concurrently send the request. The device 602 may determine a plurality of data centers based on the policy specifying a list of data centers. The device 602 may determine a plurality of data centers 510 located in the same geography. The device 602 may determine a plurality of data centers 510 located in different geographies. The device 602 may determine a plurality of data centers 510 with a latency below a threshold value. The device 602 may determine a plurality of data centers 510 based on some other selection criteria identified by one or more rules of the policy.

At step 686, the device 602 sends the request to the selected plurality of data centers 510 concurrently. The device 602 may make replicate API requests by making copies of the request to communicate to each data center. The device 602 may communicate the replicate API requests to each of the plurality of data centers 510 identified by policy, such as via rules of the policy. The device 602 may communicate the replicate API requests to each of the plurality of data centers 510 based on an order identified by one or more rules of the policy.

At step 688, the device 602 waits for one or more responses from one or more of the selected plurality of data centers 510. The device 602 may receive one or more responses from one or more of the data centers 510. The device 602 may receive some responses from some of the data centers. The device may receive responses from all of the selected data centers. Some of the data centers may not provide a response. The device may wait for a time out period for responses from any of the data centers and upon the expiration of the time out period use the responses received up to that point, such as in the selection process of step 689.

At step 689, the device 602 selects a response from the one or more received responses. The device 602 may select the first response. The device 602 may select the last response. The device 602 may select the response based on which of the requests is successful. The device 602 may compare multiple responses and select the most frequently occurring response. The device 602 may determine a range or type of expected responses and select the first response that falls within the expected range or type of responses. The device 602 may select the response based on which of the one or more responses is successful.

At step 698, the device 602 sends the selected response to the requestor. The device 602 may communicate a response selected from the one or more responses to the requestor. The response may be a response to the replicate API call. The response may comprise data requested by the requestor.

If the request is not idempotent, after step 682 the method proceeds to step 690. At step 690, the device 602 determines the one or more data centers 510 to sequentially send the API request to. The device 602 may determine timeout period(s) to wait for a response before sending the response to the next identified data center by one or more rules of the policy 604. The device 602 may determine a plurality of data centers 510 to communicate the API request by one or more rules of the policy 604. The device 602 may order the data centers 510 by one of more rules of the policy. The plurality of data centers 510 may be located in the same geography or different geographies. The device 602 may generate replicate API requests. The device 602 may communicate a first replicate API request to a first data center identified by the one or more rules of the policy 604. The first replicate API request may be associated with a timeout period for which to receive a response.

At step 694, the device 602 may wait to receive a response from the first data center until the timeout period has expired or a response is received. The device 602 may wait until the timeout period has expired to determine if one or more response has been received. The device may perform a retry of the request before the timeout period expires if a response has not been received. The device may perform a retry of the request upon expiration of the time out period and may perform a number of retries before moving to step 696.

At step 696, the device 602 may determine if a response has been received from the data center 510 before the time the timeout value has expired. If the device 602 receives a response, the method may continue to step 698. If at step 696 the device 602 does not receive a response, the method may return to step 692.

At step 698 the device 602 may send the response to the requesting device 602. The device may send whatever response is received from a data center in the sequence or chain of data centers to be called, for example whether or not an error or successful response. The device may send the first successful response that is s received from a data center in the sequence or chain of data centers to be called.

If at step 696 the device 602 does not receive a response, the method may continue at step 692 where a request is replicated and sent to a next selected data center 510. The next data center may be associated with a second timeout value. The device 602, responsive to expiration of the timeout period, may communicate for example a second replicate API request to a second data center 510, such as the second data center identified by the one or more rules of the policy.

If at step 696, a response has not been received after replicating the API call to the selected data centers, such as all data centers 510 determined in step 684, the device 602 may register that no response has been received and/or indicate a timeout or error to the requestor. If no response has been received, the device 602 may send an error message to the requestor in response to the request. In some embodiments, if no response has been received after replicating the API call to all selected data centers 510, the device 602 may determine a new set of data centers 510 to send the request and retry the method.

At step 696, the device 602 uses the response received. The device 602 may use the first response received from a data center. The device may use the response even if an error response. The device may use a first successful response received from a data center.

At step 698, the device 602 may send the response to the requestor. The device 602 may communicate the selected response to the requestor responsive to the API. The device 602 may communicate to the response over a network 104.

Various elements, which are described herein in the context of one or more embodiments, may be provided separately or in any suitable sub combination. For example, the processes described herein may be implemented in hardware, software or a combination thereof. Further, the processes described herein are not limited to the specific embodiments described. For example, the processes described herein are not limited to the specific processing order described herein and, rather, process blocks may be re-ordered, combined, removed or performed in parallel or in serial, as necessary, to achieve the results set forth herein.

It will be further understood that various changes in the details, materials and arrangements of the parts that have been described and illustrated herein may be made by those skilled in the art without departing from the scope of the following claims.

We claim:

1. A method for replicating calls to different data centers, the method comprising:
   (a) receiving, by a device intermediary to a plurality of requestors and a plurality of data centers, an application programming interface (API) request to access a service from a requestor of the plurality of requestors, each of the plurality of data centers providing the service;
   (b) identifying, by the device, a policy for the request, the policy identifying whether the API request is idempotent and one or more rules identifying one or more data centers of the plurality of data centers to replicate the API request;
   (c) determining, by the device based on the policy, that the API request is idempotent;
   (d) communicating, by the device responsive to the determination, replicate API requests to each of the plurality of data centers identified by the one or more rules of the policy;
   (e) receiving, by the device responsive to the request, one or more responses from one or more of the plurality of data centers; and
   (f) communicating, by the device responsive to the API request, a response selected from the one or more responses to the requestor.

2. The method of claim 1, wherein the requestor comprises one of a client, a server, a second service or a micro service.

3. The method of claim 1, wherein each of the plurality of data centers are located in different geographies.

4. The method of claim 1, wherein the API request is to access a micro service of a plurality of micro services that are components of the service.

5. The method of claim 1, wherein (d) communicating the replicate API requests to each of the plurality of data centers based at least on an order identified by the one or more rules of the policy.

6. The method of claim 1, wherein (f) further comprises selecting the response from the one or more responses based at least on which of the one or more responses was received first.

7. The method of claim 1, wherein (f) further comprises selecting the response from the one or more responses based at least on which of the one or more responses is successful.

8. A method for replicating calls to different data centers, the method comprising:
   (a) receiving, by a device intermediary to a plurality of requestors and a plurality of data centers, an application programming interface (API) request to access a service from a requestor of the plurality of requestors, each of the plurality of data centers providing the service;
   (b) identifying, by the device, a policy for the request, the policy identifying whether the API request is idempotent and one or more rules identifying one or more data centers of the plurality of data centers to replicate the API request;
   (c) determining, by the device based on the policy, that the API request is not idempotent;
   (d) communicating, by the device responsive to the determination, a first replicate API request to a first data center identified by the one or more rules of the policy, the first replicate API request associated with a timeout period for which to receive a response;
   (e) communicating, by the device responsive to expiration of the timeout period, a second replicate API request to a second data center identified by the one or more rules of the policy; and
   (f) communicating, by the device responsive to the API request, a response received from the second data center to the second replicate API request to the requestor.

9. The method of claim 8, wherein the requestor comprises one of a client, server, a second service or a micro service.

10. The method of claim 8, wherein each of the plurality of data centers are located in different geographies.

11. The method of claim 8, wherein the API request is to access a micro service of a plurality of micro services that are components of the service.

12. A system for replicating calls to different data centers, the system comprising:
   a device comprising one or more processors, coupled to memory and intermediary to a plurality of requestors and a plurality of data centers, wherein each of the plurality of data centers provides a service;
   wherein the device is configured to:
      receive an application programming interface (API) request to access a service from a requestor of the plurality of requestors,
      identify a policy for the request, the policy identifying whether the API request is idempotent and one or more rules identifying one or more data centers of the plurality of data centers to replicate the API request;
      determine, based on the policy, whether the API request is idempotent;
      communicate one or more replicate API requests to one or more data centers identified by the one or more rules of the policy based on the determination; and
      communicate, responsive to the API request, a response received from the one or more data centers to the one or more replicate API requests to the requestor.

13. The system of claim 12, wherein the requestor comprises one of a client, a server, a second service or a micro service.

14. The system of claim 12, wherein each of the plurality of data centers are located in different geographies.

15. The system of claim 12, wherein the API request is to access a micro service of a plurality of micro services that are components of the service.

16. The system of claim 12, wherein the device is further configured to determine, based on the policy, that the API request is idempotent.

17. The system of claim 16, wherein the device is further configured to communicate, the one or more replicate API requests to each of the plurality of data centers identified by the one or more rules of the policy.

18. The system of claim 12, wherein the device is further configured to determine, based on the policy, that the API request is not idempotent.

19. The system of claim 18, wherein the device is further configured to communicate a first replicate API request of the one or more replicate API requests to a first data center identified by the one or more rules of the policy, the first replicate API request associated with a timeout period for which to receive a response.

20. The system of claim 19, wherein the device is further configured to communicate, responsive to expiration of the timeout period, a second replicate API request of the one or more replicate API requests to a second data center identified by the one or more rules of the policy.

\* \* \* \* \*